US012638034B2

(12) United States Patent
Hurzig et al.

(10) Patent No.: US 12,638,034 B2
(45) Date of Patent: May 26, 2026

(54) CONNECTING SYSTEM, HOLE CARRIER, METHOD FOR THE ASSEMBLY OF A MODULE AND USE

(71) Applicants: André Hurzig, Leipzig (DE); Marco Zurek, Dresden (DE)

(72) Inventors: André Hurzig, Leipzig (DE); Marco Zurek, Dresden (DE)

( * ) Notice: Subject to any disclaimer, the term of this patent is extended or adjusted under 35 U.S.C. 154(b) by 747 days.

(21) Appl. No.: 17/801,271

(22) PCT Filed: Nov. 24, 2021

(86) PCT No.: PCT/EP2021/082831
§ 371 (c)(1),
(2) Date: Aug. 22, 2022

(87) PCT Pub. No.: WO2022/112335
PCT Pub. Date: Jun. 2, 2022

(65) Prior Publication Data
US 2023/0349408 A1 Nov. 2, 2023

(30) Foreign Application Priority Data

Nov. 24, 2020 (EP) ..................................... 20209584

(51) Int. Cl.
*F16B 7/00* (2006.01)
*A63H 33/10* (2006.01)
(52) U.S. Cl.
CPC ............. *F16B 7/00* (2013.01); *A63H 33/101* (2013.01)
(58) Field of Classification Search
CPC ............................ A63H 33/101; A63H 33/108
See application file for complete search history.

(56) References Cited

U.S. PATENT DOCUMENTS 2,132,647 A * 10/1938 Robins ................. A63H 33/108
D21/500
2,625,769 A * 1/1953 Hubbard .............. A63H 33/108
446/96
(Continued)

FOREIGN PATENT DOCUMENTS

DE 2550502 A1 5/1977
DE 2902267 A1 7/1980
(Continued)

*Primary Examiner* — Nicholas J. Weiss
*Assistant Examiner* — Matthew B Stanczak
(74) *Attorney, Agent, or Firm* — Viering, Jentschura & Partner mbB

(57) ABSTRACT

The invention relates to a connecting system 1, comprising at least one hole carrier 2 with a row of side openings 4 made therein in a longitudinal direction, the openings being aligned in a first orientation and in a second orientation orthogonal thereto and being made transverse to the longitudinal direction, wherein the side openings 4 of the first and the second orientation are shifted by one half the distance between two side openings 4. According to the invention, the distance between two side openings 4 is smaller than the clear width of the side openings 4, the side opening 4 of the second orientation being made within this distance and the side openings 4 of the first and the second orientation partially penetrating one another. The invention further relates to a method for building an assembly from a connecting system 1 and to a use of a connecting system 1 having the associated securing and connection elements and the installation sequence.

16 Claims, 9 Drawing Sheets

(56)        References Cited

U.S. PATENT DOCUMENTS

| | | | | |
|---|---|---|---|---|
| 2,885,822 | A * | 5/1959 | Onanian | A63H 33/101 |
| | | | | 174/138 D |
| 3,165,750 | A * | 1/1965 | Tell | H01Q 15/10 |
| | | | | 343/753 |
| 3,195,266 | A * | 7/1965 | Onanian | A63H 33/101 |
| | | | | 52/603 |
| 3,205,611 | A * | 9/1965 | Onanian | A63H 33/042 |
| | | | | 285/425 |
| 3,224,135 | A * | 12/1965 | Wright | A63H 33/086 |
| | | | | 23/301 |
| 3,469,339 | A * | 9/1969 | Thomas | A63H 33/06 |
| | | | | 446/122 |
| 3,603,026 | A * | 9/1971 | Kishigami | A63H 33/108 |
| | | | | 446/124 |
| 3,672,681 | A * | 6/1972 | Wolf | A63F 9/12 |
| | | | | 446/119 |
| 3,975,858 | A * | 8/1976 | Much | A63H 33/102 |
| | | | | 446/124 |
| 4,547,160 | A * | 10/1985 | Labelle | G09B 1/40 |
| | | | | 446/107 |
| 4,776,719 | A * | 10/1988 | Kreider | F16B 12/40 |
| | | | | D8/382 |
| 5,061,219 | A | 10/1991 | Glickman | |
| 5,199,919 | A * | 4/1993 | Glickman | G06T 9/00 |
| | | | | 446/124 |
| 5,350,331 | A * | 9/1994 | Glickman | A63H 33/062 |
| | | | | 446/124 |
| 6,461,215 | B1 * | 10/2002 | Kunz | A63H 33/042 |
| | | | | 446/124 |
| 6,736,691 | B1 * | 5/2004 | Bach | A63H 33/101 |
| | | | | 446/116 |
| D616,505 | S * | 5/2010 | Kossmann | D21/501 |
| 7,736,211 | B2 * | 6/2010 | Marzetta | A63H 33/106 |
| | | | | 446/85 |
| 7,942,717 | B2 * | 5/2011 | Chou | G06T 17/10 |
| | | | | 446/85 |
| 8,382,548 | B2 * | 2/2013 | Maggiore | A63H 33/04 |
| | | | | 446/124 |
| 8,801,491 | B2 * | 8/2014 | Bruder | A63H 33/101 |
| | | | | 446/124 |
| 9,044,690 | B2 * | 6/2015 | Uttley | A63H 33/102 |
| 9,126,086 | B2 * | 9/2015 | Howard, II | A63B 47/00 |
| 9,377,042 | B2 * | 6/2016 | De Wilde | A63H 33/062 |
| 10,130,892 | B2 * | 11/2018 | Chesser | A63H 33/04 |
| D921,127 | S * | 6/2021 | Kendall | D21/499 |
| 11,148,066 | B2 * | 10/2021 | Zhu | F21V 21/22 |
| 11,633,674 | B2 * | 4/2023 | Nevgi | A63H 33/086 |
| | | | | 446/120 |
| 11,819,774 | B2 * | 11/2023 | Chemshit | A63H 33/108 |
| 2007/0123137 | A1 * | 5/2007 | Marzetta | A63H 33/105 |
| | | | | 446/120 |
| 2007/0277459 | A1 * | 12/2007 | Marzetta | A63H 33/101 |
| | | | | 52/281 |
| 2008/0075528 | A1 * | 3/2008 | Marzetta | A63H 33/108 |
| | | | | 403/238 |
| 2008/0207082 | A1 * | 8/2008 | Warner | A63H 33/108 |
| | | | | 446/111 |
| 2009/0017716 | A1 * | 1/2009 | Marzetta | A63H 33/108 |
| | | | | 446/128 |
| 2012/0309260 | A1 * | 12/2012 | Coon | A63H 33/108 |
| | | | | 446/124 |
| 2013/0109267 | A1 | 5/2013 | Schweikardt et al. | |
| 2014/0273712 | A1 * | 9/2014 | Uttley | A63H 33/102 |
| | | | | 446/121 |
| 2018/0256999 | A1 * | 9/2018 | Gupta | A63H 33/108 |
| 2019/0063639 | A1 * | 2/2019 | d'Entremont | F16M 13/00 |
| 2022/0347594 | A1 * | 11/2022 | Marzetta | A63H 33/101 |
| 2023/0114267 | A1 * | 4/2023 | Wilson, IV | A63H 33/044 |
| | | | | 446/120 |
| 2023/0116989 | A1 * | 4/2023 | Tan | A63H 33/101 |
| | | | | 24/590.1 |
| 2023/0405484 | A1 * | 12/2023 | Lee | A63H 33/042 |
| 2025/0001323 | A1 * | 1/2025 | Kristensen | A63H 33/12 |
| 2025/0018311 | A1 * | 1/2025 | Yoon | A63H 33/108 |
| 2025/0058241 | A1 * | 2/2025 | Farco | A63H 33/062 |

FOREIGN PATENT DOCUMENTS

| | | | |
|---|---|---|---|
| DE | 8032117 | U1 | 12/1981 |
| DE | 8218544 | U1 | 10/1982 |
| DE | 3342366 | A1 | 6/1984 |
| DE | 4000802 | A1 | 7/1991 |
| DE | 9408051 | U1 | 9/1994 |
| DE | 69111204 | T2 | 2/1996 |
| DE | 10200298 | A1 | 7/2003 |
| DE | 102012017305 | A1 | 3/2014 |
| EP | 1064061 | A1 | 1/2001 |
| FR | 2560060 | A1 | 8/1985 |

* cited by examiner

CONNECTING SYSTEM, HOLE CARRIER, METHOD FOR THE ASSEMBLY OF A MODULE AND USE

CROSS REFERENCE TO RELATED APPLICATIONS

This application is the U.S. national stage of International Application No. PCT/EP2021/082831, filed on 2021 Nov. 24. The international application claims the priority of EP 20209584.0 filed on 2020 Nov. 24; all applications are incorporated by reference herein in their entirety.

BACKGROUND

The invention relates to a connecting system, comprising at least one hole carrier with a row of side openings made therein in a longitudinal direction, the openings being aligned in a first orientation and in a second orientation orthogonal thereto and being made transverse to the longitudinal direction, wherein the side openings of the first and the second orientation are shifted by one half the distance between two side openings. The invention further relates to a hole carrier for a connection system, in which side openings arranged in a longitudinal direction, aligned in a first orientation and orthogonally thereto in a second orientation, are made transversely to the longitudinal direction, the side openings of the first and second orientations being spaced by half are offset between the centers of two flank breakthroughs. The invention further relates to a method for building an assembly from a connecting system and to a use of a connecting system.

Conventional connecting systems and module systems are specific to their purpose, have their own respective established application, for example industrial applications, toy sector or furniture industry applications. Furthermore, scalability is limited. In general, the plug-in principle using recesses (toys), counter-pressure methods or clamping methods (industrial modular design and furniture design) is the norm. Toy kits are usually only suitable for assembly and playing using basic mechanical elements from the point of view of the user. The user can manipulate and handle the objects, but after assembly cannot use the objects themselves, or only to a limited extent. Producing models and disassembling them into individual parts is only enjoyable for a short while due to the size of the components, which sometimes require delicate motor skills, or due to the lack of detail of the objects.

Industrial kit systems usually include arbitrary, but application-specific bar or support cut lengths, as well as fixed, predefined positions of the connection elements based on technical requirements. As a result, a product made once from a modular system (such as a conveying apparatus or a worktable) has an established usage option due to the technical process and system requirements. Thus, the module principle is abandoned as soon as the structure is taken apart since the cut lengths are no longer needed in their prior form after they are dismantled and since the recesses are in the wrong place; to use them again would require that they be retrofitted. The modular approach is thus only applicable up to the point of the finished construction, performed only once. The modular approach is generally lost as soon as parts are cut to fit.

Module systems in furniture design are frequently limited due to standardized widths and lack of individuality. The customer can rely on a standard set of component widths, lengths, and heights, and thus make use of a predefined solution. However, if the space in which the furniture is to be utilized does not fit with the standard set due to an antiquated design or customer-specific requirements, these systems can no longer be expediently implemented. They fail due to the inability of the existing modules to be adapted due to their lack of smaller elements.

In conventional systems with holes, two sides of the components have no recesses, which results in a lack of attachment options in the third plane (see Lego®, for example). Another principle involves compensating for this lack by rotating the drilled surfaces by 90°, which results in the problem that an inserted connection element blocks the hole which was rotated by 90° (see Ticktock®). This leads to a need to orient the components relative to one another. Special elements and a large number of additional components are required in order to solve this problem using the existing geometries. Up until now, translation and rotation has been accomplished either using separate components or by connecting to components that are further away. Such a system is also very detailed and delicate, and therefore suitable for small children only to a limited extent. In addition, the system requires a tool to put it together.

Profile systems without recesses (e.g. Bosch® Rexroth®, Item®) in turn have the disadvantage of sacrificing positional precision of the components relative to one another, even though basic elements have open translational connection options. A precisely defined approach is only possible in this case using tools or equipment.

For connections made lengthwise in order to lengthen the component, conventional kits require at least one additional technical interface in order to ensure stability and expandability. In the process, the base lengths of the components or the base pattern of the components relative to one another are changed or interrupted using an intermediate piece.

Connecting systems of various kinds are known from the prior art. Patent DE 25 50 502 A1 describes a plug-in system made up of hole carrier parts, node elements, surface elements and connection elements, the system being intended for producing mirror objects, furniture, and containers, for example. The hole carrier part has the shape of an elongated cuboid and is provided with penetration holes on the longitudinal sides and blind holes on the end sides, all of the holes having the same slightly oval cross section. The node elements and surface elements also have holes with the oval cross section and are connected to the connection elements, which likewise have an oval cross section. To accomplish this, the connection element is inserted into a hole and rotated until it is clamped in place due to the oval shape. However, the disadvantage here is the fact that the strength of the connection depends on the friction relationships in effect, and above all on the degree of wear of the cross sectional areas.

Patent DE 33 42 366 A1 discloses a node element with plug sockets. There is a locking groove which runs along the plug sockets, the groove facilitating a locking of an element inserted into the plug socket by way of a pin with a hook-shaped end, the pin being inserted into said element. However, the solution proposed requires many complicated individual parts and is therefore very complicated.

Patent DE 82 18 544 U1 proposes a series of plug connections based primarily on a cone and opposing cone and supplemented with pull-out prevention. The securing means are either nipples or pins which engage in recesses, or peripheral grooves with matching protruding lips. A cruciform cross section is provided, with the surface being designed in thread-like fashion. However, excessive forces may not be transmitted through any of the proposed plug connections since force transfer may only be accomplished through the securing means. It is therefore out of the question to use an object assembled in this fashion as a vehicle, for example.

Another modular system is known from patent DE 94 08 051 U1 and comprises U-shaped profiles with holes which can be connected using bolts.

Patent DE 102 00 298 B4 describes a multipurpose disc for designing models, the disc using a connecting element to make the connection. This element has two spring tongues with hook-shaped latch moldings which reach behind a recess after being inserted into it. As a kit for machine-design, this system provides stability based on material selection, from metallic materials, and thus not solely due to the connection technique.

The toy kits known from patent DE 691 11 204 T2 provide connections in which a rod-like structural component has a cruciform cross section. Rounded, ribbed interlocking means reach into the grooves of this cross section and form a shape-locked, easily releasable connection. The ends of the structural component are provided with a groove with a semicircular cross section, and they can also reach into the interlocking means. However, solid and secure interlocking is not possible.

Patent DE 10 2012 017 305 A1 discloses a connection design having cube-shaped modules in particular, the surfaces of the cubes being equipped with corresponding force-locked plug connections or shape-locked rotating connections.

Patent US 2008/207082 A1 describes a component (14, 16, 18, 20) that can be attached to other similar components to create model structures. Each element consists of a block with similarly sized side surfaces (15, 17) and two similarly sized end surfaces, each of which has at least one opening (28, 30, 32, 34) for receiving a cone (12). One of the faces contains N spaced apertures (36,42,44) and an adjacent face (15,17) contains (N+1) spaced similar apertures (38,40,46, 48,50) also for receiving cones (12) used to join blocks together. Each block has a constant cross-section from end to end and is typically square, rectangular, triangular, trapezoidal, or hexagonal. A model structure such as a bridge or a sports station can be created by assembling blocks using the cones. Further options for the assembly of elements into games, furniture or other structural shapes are described in patents DE 2902 267 A1, DE 40 00 802 A1, US 2013/0109267 A1 and DE 80 32 117 U1.

SUMMARY

The invention relates to a connecting system 1, comprising at least one hole carrier 2 with a row of side openings 4 made therein in a longitudinal direction, the openings being aligned in a first orientation and in a second orientation orthogonal thereto and being made transverse to the longitudinal direction, wherein the side openings 4 of the first and the second orientation are shifted by one half the distance between two side openings 4. According to the invention, the distance between two side openings 4 is smaller than the clear width of the side openings 4, the side opening 4 of the second orientation being made within this distance and the side openings 4 of the first and the second orientation partially penetrating one another. The invention further relates to a method for building an assembly from a connecting system 1 and to a use of a connecting system 1 having the associated securing and connection elements and the installation sequence.

DETAILED DESCRIPTION

The object of the present invention is to provide a connecting system and a method for its construction, the connecting system being universally useful, easy, and intuitive to assemble and stable and secure in its functioning. In the process, the limits between areas of applicability and industries pointed out in the prior art are intended to be overcome, and applications expanded.

This object is achieved by a connecting system comprising at least one hole carrier with a row of side openings made therein in a longitudinal direction, the openings being aligned in a first orientation and in a second orientation orthogonal thereto and being made lateral to the longitudinal direction, wherein the side openings of the first and the second orientation are shifted by one half the distance between two side openings. The connection system further comprises at least one connection element, for example a cross connection element or a round connection element, fas described below. According to the invention, the distance between two side openings in the first orientation is smaller than the clear width of the side openings, the side opening of the second orientation being made within this distance and the side openings of the first and the second orientation partially penetrating one another.

In the present invention, the grid patterns are produced by the side openings on each longitudinal side, or flank (not merely on two opposite sides of the total of four sides), and each grid pattern is situated intermittently between the side openings of the adjacent flanks, respectively. The side openings themselves form their own grid dimension per pair of sides. Thus, two partial grids engage with one another (or three in the case of addition use of the ends), thereby shortening the grid distances. The spatially nearest recess in the other respective orientation or direction provides the option of working with a substantially tighter overall grid due to the overlapping of two partial grids in the two orientations.

The grid dimension, which depends on the component dimension and the diameter of the openings, is made smaller by way of this arrangement in comparison to simple grids of similar component lengths in other construction kits, which results in an increase in possible connection positions. The technical options for adjacent elements are substantially more numerous than in simple openings without adjacent sides in a different orientation.

Theoretically, the length scaling options are unlimited. The cross-sectional scaling option depends on the technical requirements of the respective industry, the materials selected and on the available tools that can be used.

In this way, the design of the respective two adjacent side openings of intermittent orientation and alternating rotation by 90° resembles a kind of "nested honeycomb grid", thus resulting in an extremely stable shape. Surprisingly, the design of the hole carriers according to the invention has proven to be extremely stable even at comparatively low weight, which is a further advantage of the present invention.

It is advantageous for the side openings in the hole carrier to have a cross section wherein a circular cross section is overlapped by a cruciform cross section in such a way that the contour of the circle is broken up at four places evenly distributed along the periphery. These broken-up places, which form continuous grooves in the side opening in the direction of the hole axis, provide a geometrical component penetration—due to the narrow design space—and corresponding cross ribs run along the periphery of the cruciform connection element parallel to the axis of the cruciform connection element. This embodiment makes it possible to secure against undesired disassembly in reverse order of component joining by the fact that the last part joined secures the parts added prior to it. Thus, round connecting elements (rotatable) of various lengths and cruciform connection elements (non-rotatable) exist as connection elements, the cruciform connection elements in the respective adjacent side opening either selected to secure or release the connection element in position. Each of the connection elements can in turn hold and/or secure further hole carriers or other appropriately-sized components in the same manner.

In addition, each of the connection elements (with a cruciform or round cross section) can be inserted into each side opening. In addition to making the connection options more compact, the mechanical effect per connection point (rotation or rotation block) is also increased at the same time this way.

It is therefore possible to integrate both rotatable round connecting elements as well as non-rotatable cruciform connection elements. Rotational securing and rotatability can be enabled in one and the same side opening in this way. Also, a cruciform connection element and/or a round connection element can be integrated in each case into directly adjacent side openings.

According to a preferred embodiment, at a first and/or a second end of the at least one hole carrier, at least one of the ends comprises end openings with the same cross section and the same contour as the side openings, or simply with a circular cross section, the diameter of which corresponds to the outside diameter of a pin, i.e. such that the side opening and pin can be joined with a clearance fit.

An advantageous hole carrier has a rectangular cross section with edge length B, with rounded edges which are lateral to the longitudinal direction.

In the preferred connecting system, at least one cruciform connection element is provided with a cross section which corresponds to the cross section of the side openings, i.e. such that the side opening and the cruciform connection element can be joined with a clearance fit. Alternatively or in addition, at least one round connection element is provided with a cross section which corresponds to the round part of the cross section of the side openings, i.e. such that the side opening and the round connection element can be joined with a clearance fit.

An advantageous embodiment of the at least one cruciform connection element comprises at least one dual groove on at least one side surface of a longitudinal side, the side surface extending in the longitudinal direction. The dual groove runs lateral relative to the longitudinal direction and represents a peripheral bulbous notch. The profile of the dual groove corresponds to the exterior contour of the longitudinal side of the at least one cruciform connection element. The dual groove has a depth which is equal to the penetration of the side openings of the first and the second orientation.

In the same manner, the at least one round connection element has at least one circular double annular groove on an outside surface whose profile corresponds to the outer contour of the longitudinal side of the at least one cruciform connection element, the double annular groove also having a depth which is equal to the penetration of the side openings of the first and the second orientation.

As a result, a cruciform connection element or a round connection element can first be inserted into a side opening, and a further cruciform connection element can be inserted into the side opening directly adjacent and 90° offset, i.e. into the second orientation, perpendicular to the first cruciform connection element or perpendicular to the round connection element. Although the profiles of both side openings overlap, i.e. partially penetrate each other, the double grooves allow the other cruciform connection element to be used since it can slide into the double grooves, and since it mirrors the penetration of the profiles of the side openings. The cruciform connection elements and round connection elements are thus designed such that the adjacent cruciform connection element or round connection element to be inserted into a small space can be pushed past the respective element in contact therewith. In this way, this type of design makes a substantially tighter grid dimension possible—relative to the base geometry of the components—than is the case in conventional plug-in systems.

Furthermore, the cruciform connection elements and the round connection elements are notched using dual grooves or dual annular grooves such that an adjacent connecting element can be selected to again have a circular cross section (for rotational mobility) or a cruciform cross section (for rotational securing). At the same time, the principle of geometrical penetration is used as a functioning principle for mutual obstruction and component securing. The underlying working principle can be described as a sequential geometric obstruction, depending on the sequence of assembly: a round connection element obstructs a cruciform connection element against being pulled out/provided that the round connection element is inserted as the last element. A cruciform connection element can also obstruct, or prevent pull-out of, a cruciform connection element in the sequence of assembly.

This provides options for blocking the components from the outside using blocking elements, designed as short cruciform connection elements. This allows one and the same type of component to provide both for a stable connection in general and to provide for a secure connection at the same time.

Furthermore, it is possible to work both in fully-connected and in half-offset mode by way of the penetration depth (=the depth of insertion of axes into the side openings). In order to reach a half-offset mode, the peripheral dual groove or dual annular groove may be axially offset, half-offset being along the axis of the connection element. In this way, the dual groove or the dual annular groove is no longer able to be penetrated by other components, which is the case in full offset mode in the manner described above.

This ensures an insertion prevention for subsequent parts, for example with the goal of forcing a minimum distance if the connection element is first inserted at half offset. In an alternative application, absolute pull-out blocking of the prior component is achieved when the connection element last inserted was at half offset.

Thus an additional optional obstruction effect due to friction may contribute to the geometrical obstruction by use of the half-offset of the axes. A pairing of connection elements secured in this way is not only positionally secured, but is also extremely stable, considering the packing density, since the side openings are completely filled.

The sequence and geometry of the inserted components determines the external obstruction effect against pull-out from the side openings (positional securing) without the use of tools To this end, respective dual annular grooves and dual grooves are made in both the round connection elements as well as in the cruciform connection elements.

It is further advantageous for the at least one cruciform connection element to have two dual grooves and the at least one round connection element to have two dual annular grooves and a length which is equal to twice the edge length B, the contour of the dual grooves and the dual annular grooves matching the surface contour of the cruciform connection element, and the distance between the two dual grooves or the two dual annular grooves being equal to the edge length B. This makes it possible for two hole carriers to be joined sufficiently closely together so that the functioning of the connecting system according to the invention is facilitated. If only the simple edge lengths of the cross section is used, these connection elements will only aid in the final positional securing of the overall design.

For a further improvement of the functioning of the connecting system according to the invention, at least one securing connector is provided which has a respective securing pin at both sides. At least one of the securing pins is designed as a round pin or cruciform pin provided for use in a side opening, or as a securing pin for use in the end opening. If the securing connector is equipped with two securing pins, two hole carriers may be connected together at the ends thereof. It is possible, using a securing pin on the one hand and a round pin or a cruciform pin on the other, to connect two hole carriers, one of which being connected rotatably or rotationally fixed at the end to the other on the side thereof.

Thus, the invention provides a way to execute a wide variety of length extensions and length changes by way of connection at the ends. This produces an advantage over conventional industrial plug-in systems or such systems in the furniture industry where the dimensions are usually predefined or are restricted due to the dimensions and technical feasibility. Each building block thus obtains, at the end, another point of connection for a connection element. This eliminates the problem of a lack of scalability, or of poor scalability, and also provides an advantage regarding the angular position of the end connection. In the present connecting system, according to the advantageous embodiment of the connection elements for the ends can on the one hand be rotated (optional relative positions of connected components) or can be forced into dedicated angular positions, including those which deviate from right angles, as in the preferred embodiment, using the angle geometry of the angle pieces, for example a round connector angle piece or cruciform connector angle piece.

The use of a connection element as a securing connector or the angle pieces just described now allows the longitudinal connection at the ends of the hole carriers to result in a component extension, and through repetition theoretically to infinite reproducibility with free choice options for the angular position. The present system consequently results in an extension or shortening of the base grid pattern, depending on the connection piece used, but is conceived to provide the advantage of maximum flexibility and connectivity due to the overall increase in modularity (free rotation, angular position) of the overall system. The grid dimension is thus also integrated into the end of the previous and the next component, respectively, so that the grid dimension can continue uninterrupted after connection of two hole carriers at the ends. In addition, free or specified rotation is possible using a round connection element or a securing connector. Adjacent hole carriers can be attached in any angular position and orientation through expansion via the ends using securing connectors or an angle piece and the overlapping grid.

It has also been shown to be advantageous for a blocking element whose cross sectional shape corresponds to that of the side openings to be included and for its length to be the same as the edge length B so that it can be completely countersunk in the side opening. The blocking element has a blocking effect on a cruciform connection element or a round connection element which is the first to be inserted into an opening. Then, the blocking element is inserted into the directly adjacent opening, namely in the second orientation perpendicular to the cruciform connection element or the round connection element. Although the profiles of both openings overlap or partially penetrate one another, the dual grooves allow the blocking element to be used since it can slide into the dual grooves of the cruciform connection element or round connection element.

Increased secureness of the connecting system according to the invention is achieved using a pull-out preventer for the cruciform connection element and/or for the round connection element. The cruciform connection element and/or the round connection element have a securing receptacle into which the pull-out preventer is inserted. The pull-out preventer is advantageously designed such that it can only be removed using a tool. This prevents any undesired or unintended removal, for example by children while playing.

In a further advantageous embodiment of the connecting system according to the invention, a further, preferably cube-shaped, angle piece is also provided, the securing connector angle piece, which comprises at least two protruding securing pins which are directed perpendicular relative to one another. This allows two hole carriers, or the same number of hole carriers as the number of securing pins, to be joined together in the preferably perpendicular position, or at a different angle. There are various connection options depending on the design of the securing pins.

If the angle piece is designed as the round connector angle piece, and if it comprises at least one round pin as a securing pin, rotatable connections between the hole connectors can be implemented at the sides thereof. On the other hand, if the angle piece is designed as a cruciform connector angle piece and if it comprises at least one cruciform pin as a securing pin, the connection is rotationally fixed. If, in turn, the angle piece is designed as a securing connector angle piece and if it comprises at least one securing pin as a securing pin, then secured connections can be implemented, in particular at the ends of the hole carriers.

The securing pin comprises a securing receptacle which is made perpendicular to the axis thereof, a pull-out preventer able to be inserted into said receptacle. A securing blocking element is also required for securing purposes. In contrast to the blocking element, this element comprises a pin receptacle, an opening lateral to the longitudinal axis and also the axially-located securing receptacle. In installing a securing connector angle piece or a securing connector at the end of the hole connector, the securing blocking element is first inserted adjacent to the end opening, i.e. into the last side opening prior to the end. Then, the securing pin is inserted into the end opening and slides simultaneously into the pin receptacle of the securing blocking element. In a last assembly step, the pull-out preventer is inserted, passing through the securing receptacle in the securing blocking element and in the securing pin. A secure connection is thus achieved in which neither the securing pin nor the securing blocking element can be removed provided that the pull-out preventer is inserted. The joining in sequential order can be done without the use of tools, but for safety reasons disassembly requires a tool provided for this purpose so that no undesired disassembly can take place.

The object of the present invention is also achieved using a method for building an assembly from a connecting system according to one of claims 1 to 13. According to the invention, the rotationally fixed connection of two hole carriers is accomplished using a cruciform connection element which is inserted into a respective side opening of each hole carrier, and the rotatable connection of two hole carriers is accomplished using a round connection element which is inserted into a respective side opening or an end opening of each hole carrier. Securing against pull out of the cruciform connection element or the round connection element is accomplished using a cruciform connection element or blocking element perpendicular to the cruciform connection element or round connection element in the adjacent side opening.

In an advantageous improvement, the method for building provides a corner connection using an angle piece, the protruding pin of which is inserted into the side opening or the end opening of the hole carrier. An end connection is accomplished using a securing connector whose protruding pin is inserted into the end openings of the hole carriers to be connected.

According to an advantageous improvement, the blocking element is designed as a securing blocking element and comprises a securing receptacle into which a pull-out preventer is inserted which prevents removal of the securing blocking element, the pull-out preventer only able to be removed using a tool.

Another aspect of the present invention relates to a use of a connecting system according to one of claims 1 to 13 as a toy, a furniture system, a module system or kit system. Due to the possibilities for securing, as described above, the objects so assembled also offer increased safety. Therefore, even child vehicles in which children can move about, and which therefore must meet more stringent safety requirements can be assembled.

The principle of hole friction is presented and developed here. The connection elements are therefore pluggable and are introduced into the recesses or openings. They are held by themselves in the opening due to shape and friction locking and are at the same time the joining member to adjacent elements. The working principle of self-locking is understood here as geometric component penetration.

In summary, the present invention offers a connecting system which can portray three-axis rotary securing and rotating ability, position securing and pull-out blocking from only three basic varieties of building blocks and in very narrow spaces. By way of geometric pairing, the connecting system can be assembled completely without tools, and can be determined using only the geometry of the components.

Most kit-type systems in the toy industry have a special cross section (a:a; a:m) tailored to the function of the modular cross section (a:a; a:m) of the edge length a at the cross section and the length m. This affects to some extent the expansion flexibility or design restrictions limited to single-axis systems. Industrial kit systems range from narrow rectangular (a:m) to square (a:a) to nearly over-defined cross sections (polygons). The technical possibilities are thus limited by the technical area of application. For the present invention, a square cross section (a:a) was selected as the base geometry. This cross section not only allows scaling by module expansion, but also enables scaling to other load cases at any time through simple cross section factorization (a*n:a*n) of hole carriers and connection elements. The length of the hole carriers is always a multiple of the cross section in order to ensure multi-directional scalability, which is in theory unlimited.

The principle of numerical scalability illustrated above, as well as associated connection possibilities (round connection element, cruciform connection element) in a more flexible hole grid is also supplemented by the added value of active utility. Scalability makes assemblies useful for practical applications. For example, at favorable scaling, a toy can be created from a plug-in modeling system (for example toy kits), which offers advantages not just during assembly, but also during operation as a toy device. The underlying basic geometry is large enough to allow child-proof ergonomic use after assembly of the parts. Further scaling is possible in the direction of all industrial fields of application.

If correct technical assembly of the individual parts is done, a stable and robust system can also be produced for industrial applications. This is achieved by the design of the plug-in system (material selection and support elements used), which arise from the intrinsic scalability.

In construction kits according to the invention, the recesses are arranged symmetrically on opposite component sides, and translation and rotation can occur in one and the same hole, side opening or end opening. The grid dimension is determined by the simple grid distance and can essentially not be reduced since then the strength of the components suffers.

Overall, the invention incorporates a combination of advantages of various plug-in systems and kits while reducing or avoiding their disadvantages. Due to the potential savings in weight, the functionality with dual grid patterns, stability, and theoretically infinite expandability in combination with the obstruction principles illustrated above (geometric penetration, shape-locking, half-offset), an advantageous approach results for kit-type systems and connecting systems. The connecting system according to the invention is thus open with regard to application and industry, is scalable and arbitrarily expandable.

BRIEF DESCRIPTION OF THE DRAWINGS

The invention is explained in more detail below with the aid of the description of exemplary embodiments and their illustration in the associated drawings. Shown are.

DETAILED DESCRIPTION OF THE PREFERRED EMBODIMENTS

Figure 1:
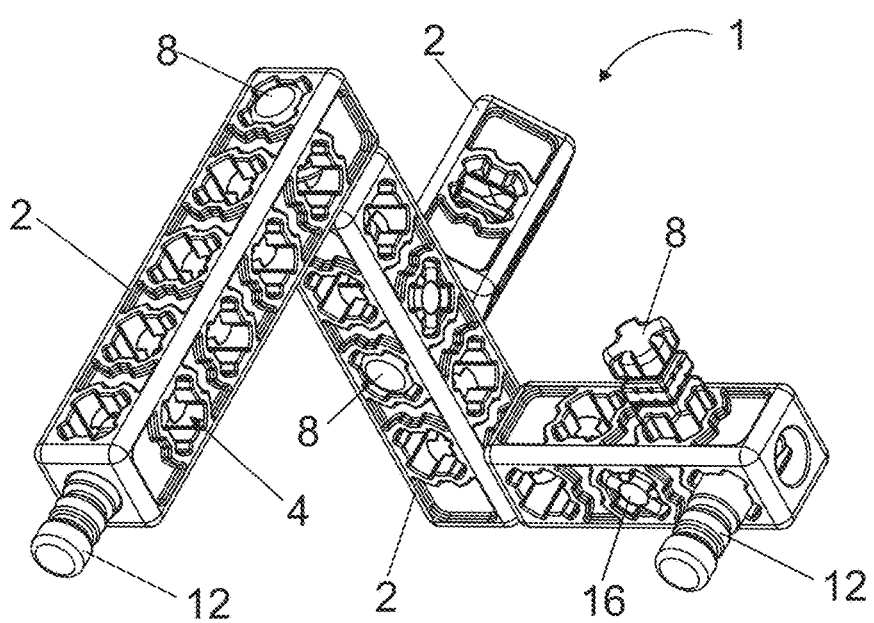
FIG. 1: a schematic perspective of an embodiment of a connecting system according to the invention.

FIG. 1 shows a schematic perspective view of an embodiment of a connecting system 1 according to the invention, the structure of hole carriers 2 of various lengths and thus of varying numbers of side openings 4. What is shown is the option of a free angular position, different connection options rotational locking, rotatability and securing of the axial position by way of the components used.

A first hole carrier 2 has 4 and 3 side openings 4, respectively, a total of 7 openings, oriented at 90° angles relative to one another, the beam hereinafter being referred to as a 4-3 hole carrier 2. The identifier 4-3 refers to the hole distribution and thus to the length of the scalable hole carrier 2. The end of the 3-2 hole carrier 2 is fastened to the side of the 4-3 hole carrier 2. The side of the 5-4 hole carrier 2 is located horizontally at the end of the 4-3 hole carrier 2 opposite to the 3-2 hole carrier and forms an end connection at a 90° angle. The side opening 4 pattern is repeated in all hole carriers 2 used, with regard to design and function, regardless of length, and thus represents the typical design of the connecting system 1 according to the invention.

Figure 3:
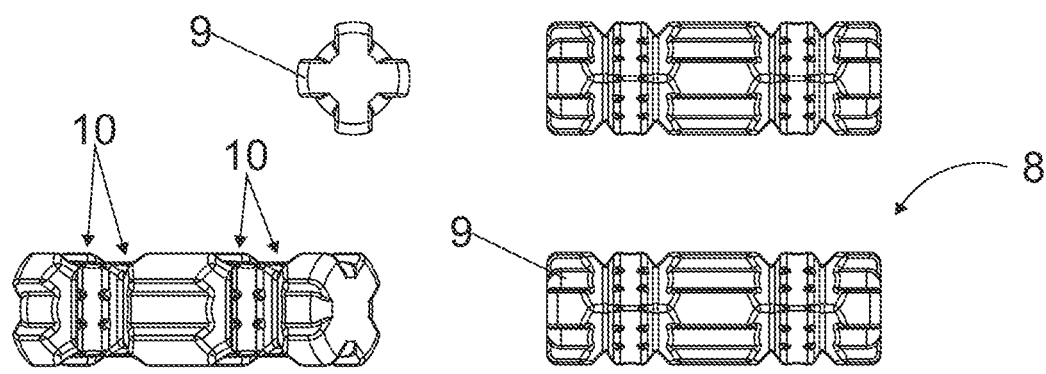
FIG. 3: schematic views from three sides and in a perspective of an embodiment of a cruciform connection element according to the invention.

To connect different hole carriers 2 in a positionally-secured, parallel manner, cruciform connection elements 8 are used (see also FIG. 3). These elements allow the connection of two building blocks (m-n) in freely selectable adjacent side openings 4 in a positionally fixed manner relative to one another. Removal and insertion are achieved solely by manual force unless a locking element 16 (see also FIG. 5) is used. In addition to vertical and free positioning, the cruciform connection elements 8 also allow a parallel arrangement of two hole carriers 2 relative to one another as well.

In addition, round connection elements 12 (see also FIG. 4) are used for purposes of rotatable connection of parallel hole carriers 2, or for connection to the ends of the beams. The round connection elements 12 secure two hole carriers 2 in freely selectable adjacent side openings 4 relative to one another in a freely selectable angular position. Here, as well, removal and insertion are achieved solely by manual force unless a locking element 16 is used, the cruciform design of which [is used?] to secure the axial position of adjacent connection elements (cruciform connection elements 8 and/or round connection elements 12). Also provided is a locking element 16 (see FIG. 5) for connection elements 8 and 12, the locking element taking effect by engagement in its dual groove 10 or dual annular groove 14. For safety reasons, the pull-out preventer requires force and a tool to be removed and is countersunk flush with the surface. Also, it cannot be pushed through using the tool and may only be removed in the direction of insertion, accessed from the outside.

Figure 2:
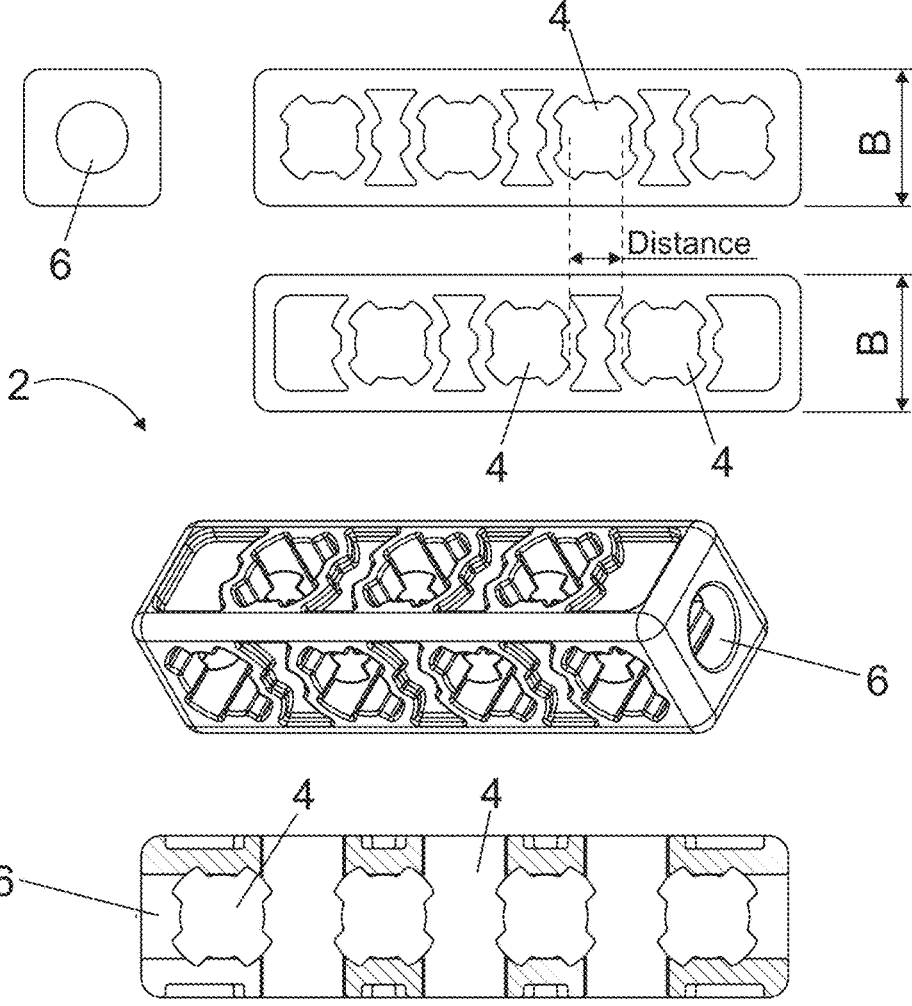
FIG. 2: a schematic view from three sides; a perspective view and a sectional representation of an embodiment of a hole carrier.

FIG. 2 shows schematic views from three sides, a perspective view, and a sectional representation of an embodiment of a hole carrier 2 according to the invention, here a 4-3 hole carrier 2. According to the preferred exemplary embodiment of a connecting system according to the invention, the number of side openings 4, 4 and 3, totaling 7, defines the hole distribution and thereby the length of the scalable hole carrier 2, beginning with a 2-1 hole distribution and ending with a 15-14 hole distribution. 4-3 (in general m-n) indicates that there are four side openings 4 on one side and three side openings 4 on the respective adjacent side which is offset by an angle of 90°. Since the width B of all sides is the same, the result is a square cross section.

This two-sided, unequal m-n grid pattern allows the densest possible connection structure to be created, and the adjacent side openings 4, which are offset by 90°, can even mutually obstruct and secure one another. This makes a very detailed connection between the different basic building blocks possible. By way of incrementalization of m-n, the computable scalability can be defined as theoretically infinite.

With their appearance, functionality and arrangement, the side openings 4 essentially define the design of the hole carrier 2. The side openings 4 are arranged at equal distances to one another on each respective side of the hole carrier 2. The distances of the side openings 4 from one another on respective adjacent surfaces, i.e. the sides which are offset by 90° to one another, are identical, but are shifted by one half the distance; this creates a specific whole-numbered grid dimension per side, resulting in the m-n relationship.

The typical pattern of a side opening 4 repeats itself at regular intervals. The shift between the two sides that are offset by 90° by one half the width of one of the side openings is indicated using two dashed lines connecting the two views. The side openings so shaped can hold both round connection elements 12, which must be actively obstructed, as well as cruciform connection elements 8 in which self-locking is possible; combinations of these are also possible. On the one hand, this provides a variety of connection possibilities in a single side opening 4. Also, the connection possibilities are not only achieved for static and moving elements using the connection elements 8, 12 themselves, but also from the building block design. The combination of both facilitates the working principle according to the invention.

The areas between the side openings 4 indicated depressions which generate both an optimum of material savings (notches) and component stability (rib structure). In the preferred embodiment, significant rounding of all external edges and contours contribute to a child-proof, safer toy, and a smooth, playful design.

The contour of the side openings 4 and the end openings 6 disclose the possibilities for introducing a variety of connection elements, in particular:

introducing circular connection and securing elements (rotatability) into the building block, introducing specially shaped cruciform connection and securing elements (for positional securing), clarifying the 90° offset and tight adjacent positioning of two cruciform hole cross sections (multi-axis connections with mutual penetration for positional securing with the densest possible arrangement).

FIG. 3 shows schematic views of three sides, and in a perspective, of an embodiment of a cruciform connection element 8 according to the invention, the length of which, in order to connect two hole carriers 2, is equal to twice the edge length B at the cross section of the hole carrier 2 in the exemplary embodiment shown. Due to the shape of the cruciform geometry, the cross section of the cruciform connection element 8 with its cross ribs 9 and the contour of the side opening 4, the cruciform connection element 8 itself cannot be rotated when inside the hole carrier 2.

Figure 4:
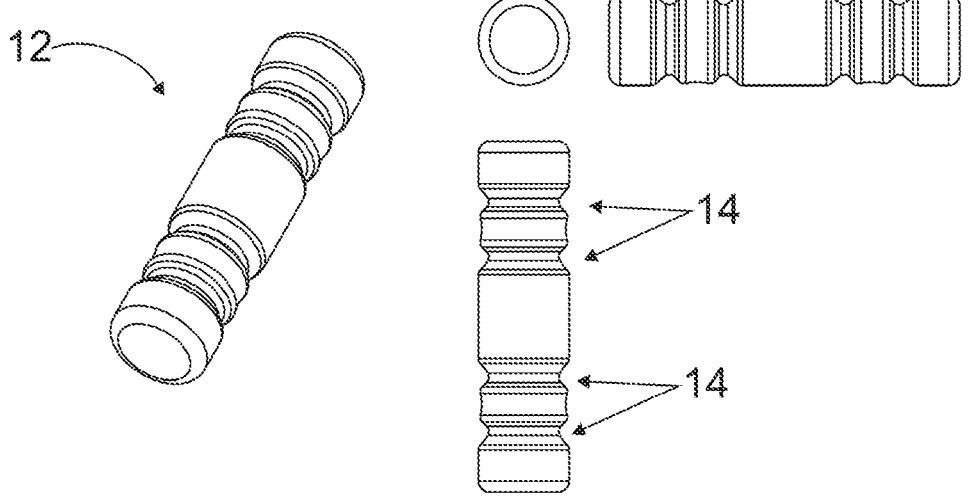
FIG. 4: schematic views from three sides and in a perspective of an embodiment of a round connection element according to the invention.

The frictional pairing between the cruciform connection element 8 and the hole carrier 2 leads to self-locking. The length of the cruciform connection element 8, and of the round connection element 12 as well, described thereafter in FIG. 4, is also scalable similar to the hole carriers 2, and depends on the number of adjacent parallel hole carriers 2 to be connected together. By adapting the angular positions of the cruciform connection element 8 according to the respective edge length, i.e. width B, of the hole carrier 2 (which is equal to the penetration depth of the cruciform connection element 8), fixed angles beyond 0° and 90° can be established as relative positions of the hole carrier 2 using a cruciform connection element 8 so designed.

The sides of the cruciform connection element 8 have a specially-shaped profile with cruciform ribs 9 on the cylindrical outer surface in order to establish non-rotating connections. For adjusting the angular positions, the cruciform ribs 9 do not extend all the way through along the entire surface of the cruciform connection element 8 but are interrupted after a length equal to width B and continue shifted by the desired angle.

The cruciform connection element 8 also comprises at least one dual groove 10—two dual grooves in the exemplary embodiment shown—for mutual penetration of the connection elements 8, 12 (see also FIGS. 8 to 12) with adjacent securing elements and connection elements 8, 12. These dual grooves 10 make it possible for the adjacent connection elements 8, 12 to form a secure axial position and pull-out prevention of the connection elements 8, 12 relative to one another and with one another. Additional securing elements are thus unnecessary. The geometry of the dual grooves 10 in this case matches the (negative) outer geometry of the cruciform connection element 8, primarily the geometry of the cruciform ribs 9.

FIG. 4 shows schematic views of three sides, and in a perspective, of an embodiment of a round connection element 12 according to the invention, the length of which in the exemplary embodiment shown is also equal to twice the edge length B at the cross section of the hole carrier 2 for connecting two m-n base building blocks. Due to the cylindrical geometry, rotation of the round connection element 12 itself in the hole carrier 2 is possible and desired. The length of the round connection elements 12 is also scalable similar to those of the hole carrier 2 itself and depends on the number of adjacent parallel hole carriers 2 which are to be put together using the round connection element 12. The sides of the round connection element 12, its cylindrical exterior, [has] a simple cylindrical profile for establishing rotatable connections, in particular connections to hole carriers 2.

The dual annular grooves 14 ensure the mutual penetration of connection elements 8, 12 with adjacent securing elements and connection elements 8, 12. These dual annular grooves 14 make it possible for the adjacent cruciform connection elements 8 to form a secure axial position and pull-out preventer of the round connection elements 12. Additional securing elements are thus unnecessary. The geometry of the dual annular grooves 14 in this case matches the negative contour of the cruciform connection element 8, primarily the contour of the cruciform ribs 9 thereof.

Figure 5:
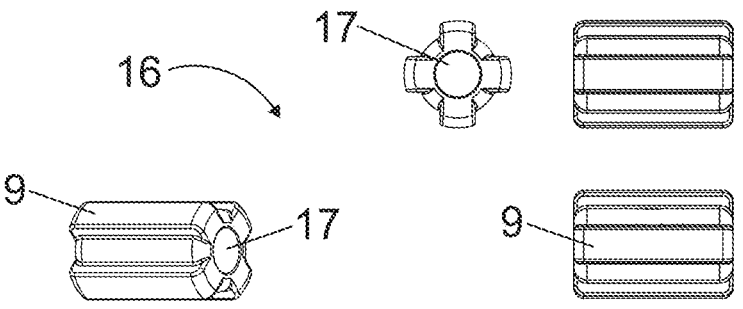
FIG. 5: schematic views from three sides and in a perspective of an embodiment of a blocking element according to the invention.

FIG. 5 shows schematic views of three sides, and in a perspective, of an embodiment of a blocking element 16 according to the invention in cruciform cross section, in the manner of a short cruciform connection element 8 with a length which is only as long as the width B of the hole carrier 2. The geometry is the negative contour of a fully shaped side opening 4, having a corresponding clearance fit in order to facilitate assembly.

In addition, a pull-out hole 17 can be present in the core of the blocking element 16 as shown in the example, it being possible to introduce into the hole a tool for pulling out the blocking element 16. The tool grasps the blocking element 16 in the pull-out hole 17 using frictional locking, using threads, a bayonet, penetration followed by opening, or similar. The length of this securing element is always as long as the simple cross section of a simple hole carrier. As such, this shortest securing element only has a purely retaining function and reaches into the grooves 10, 14 (see FIGS. 3 and 4) of other connection elements 8, 12 (see FIGS. 3 and 4) in order to secure them in position.

The blocking element 16 itself has no double groove 10 since it performs the blocking function of the double groove 10 or double annular groove 14 of the connection elements 8, 12 from FIGS. 3 and 4. The axial position of the blocking element 16 is always 90° offset relative to the previously inserted connection element 8, 12. The axes of the connection element 8, 12 and the blocking element 16 are thus perpendicular relative to one another, and have the appropriate half-shift of side openings 4. Skillful insertion of one of these blocking elements 16 results in the securing of two laterally adjacent connection elements 8, 12, which are offset by 90° for this purpose, in their respective positions. The respective inserted connection elements 8, 12 touch one another due to this design and due to the specific arrangement of the side openings 4 due to their penetration, thereby preventing unintended pulling out of the connection elements 8, 12 in the sequence of their installation. Die clearance tolerances (precision) must be specified to be finer in this case in order to ensure the highest possible pull-out security. Die security against unintended removal increases as a result. As such, a tool must be inserted in order to remove it by overcoming the incident friction.

Figure 6:
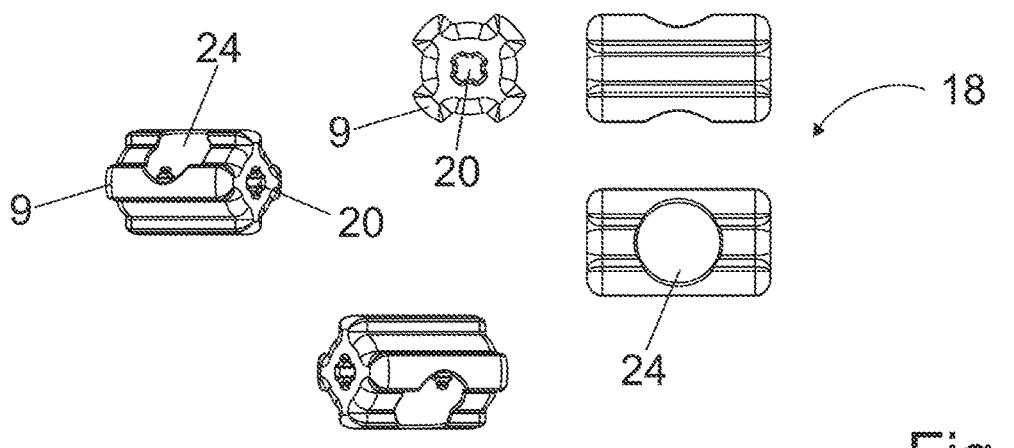
FIG. 6: schematic views from three sides and in a perspective of an embodiment of a securing blocking element according to the invention.

FIG. 6 shows schematic views of three sides, and in perspective, of an embodiment of a securing blocking element 18 according to the invention, the blocking element being designed as a radially drilled securing element, achieved by drilling a round hole in the side perpendicular to the longitudinal axis on one side. In this way, a defined installation position is specified. In the installation position provided, the side hole of the securing blocking element 18, the hole forming a pin receptacle 24, is arranged coaxial to the end opening 6 of the hole carrier 2. This is the only way to achieve the required connection stability when the elements are installed. The hole carrier 2 itself lies in the last cruciform hole of the building blocks, then receiving end pins 27, 29, 31 there, in particular securing pins 31 (see FIGS. 13 to 17).

The pin 27, 29, 31 of an angle piece 26, 28, 30 (see FIGS. 13 to 16) is now introduced into the pin receptacle of securing blocking element 18. This pin can still be pulled out in the direction of the end of the hole carrier 2 and is secured using a pull-out preventer 22 in a securing receptacle 20 (see FIGS. 7 and 16).

To secure against unintended pull-out, the securing blocking element 18 itself is also perforated with an additional end hole, called the securing receptacle 20. This hole preferably has the miniature contour of the cruciform connection element 8 and receives a pull-out preventer 22 which is adequate based on its cross section as a final securing means.

Figure 7:
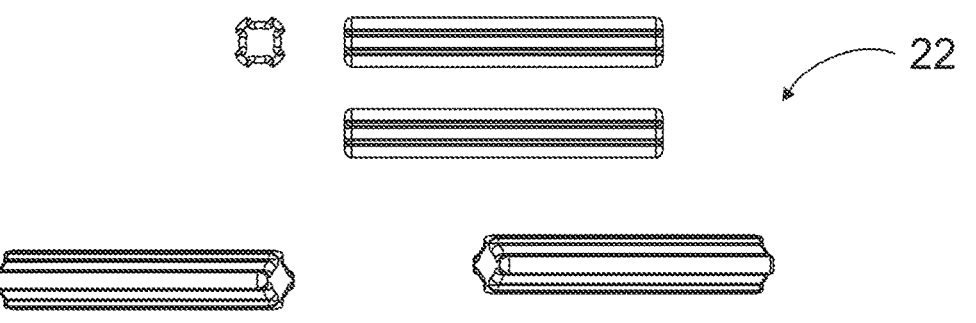
FIG. 7: schematic views from three sides and in two perspectives of an embodiment of a pull-out preventer according to the invention.

FIG. 7 shows schematic views from three sides and in two perspectives of an embodiment of a pull-out preventer according to the invention 22. As already explained in FIG. 6, this additional securing element is inserted into securing blocking element 18 after a securing pin 31 (see FIGS. 15 and 16 or FIG. 17) has been inserted into pin receptacle 24. Securing blocking element 18, hole carrier 2 and the inserted angle piece 26, 28, 30 are all penetrated by the pin. In the process, all penetrated parts are fixed in position due to shape-locking and are thereby secured against being pulled out.

Figure 8:
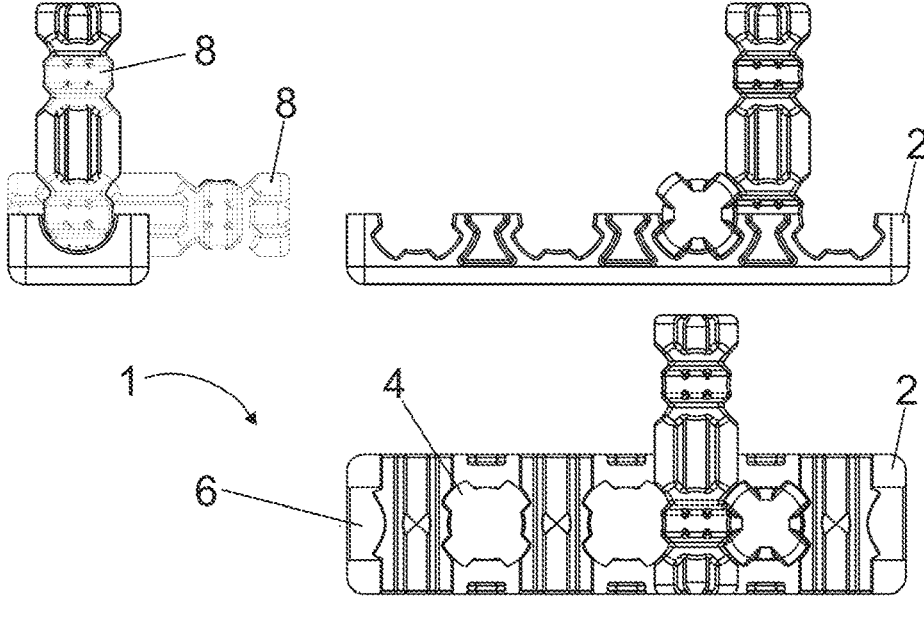
FIG. 8: a schematic view from three sides of an embodiment of a connecting system with section of a hole carrier according to the invention.

FIG. 8 shows schematic views of three sides of an embodiment of a connecting system 1 according to the invention, with the hole carrier 2 cut open in the interest of better clarity, and with adjacent connection elements, here two cruciform connection elements 8, in the side openings 4. It is shown that the parts fit together with almost no play. At the same time, this arrangement effectuates a block against pull-out of the cruciform connection element 8 first inserted, the blocking being accomplished by the cruciform connection element 8 inserted last. Thus, the sequence of assembly is important to the manner of blocking and fixing of the connection elements 8, 12.

Figure 9:
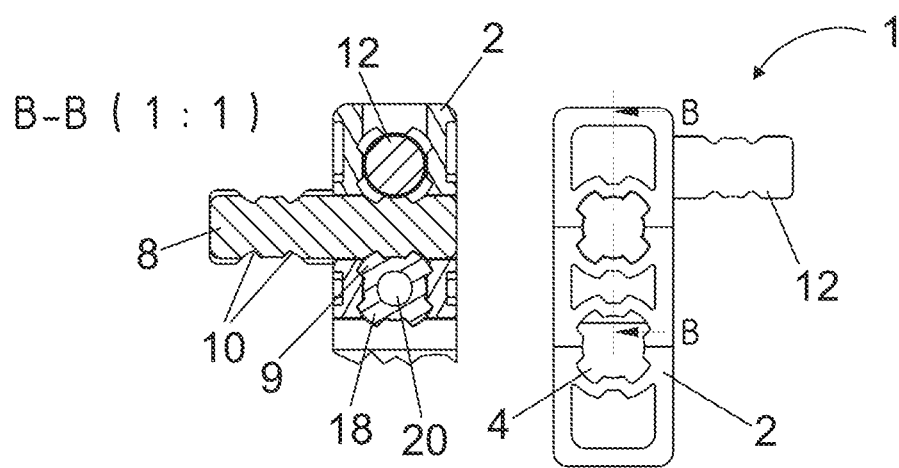
FIG. 9: schematic views from two sides with a sectional representation; wherein a blocking function of a connecting system according to the invention is illustrated using a securing blocking element.

FIG. 9 shows schematic views from two sides with a sectional representation, wherein a blocking function of a connecting system 1 according to the invention is illustrated using a securing blocking element 18. When securing element 16 or securing blocking element 18 is inserted, as shown, the round connection element can only be pulled back out when the securing element 16 or securing blocking element 18 has been removed. The connection of hole carriers 2 to the round connection element 12 is designed as being rotatable on both sides of the connection, with a desired rotation.

A cruciform connection element 8 with an adjacent round connection element 12 and a securing blocking element 18 is again used here. The cruciform connection element 8 is secured due to engagement of the cruciform ribs 9 of the securing blocking element 18 in the dual groove 10. The securing blocking element 18 is identified by the securing receptacle 20 for tool access.

Skilled arrangement and combination of various elements relative to one another facilitates or hinders selective rotation and/or translation. Free and fixed angular positions can be implemented simultaneously, and a pull-out preventer can be optionally provided or excluded. Parallel and/or non-parallel oriented positions of the hole carriers 2 relative to one another are also simultaneously possible.

Figure 10:
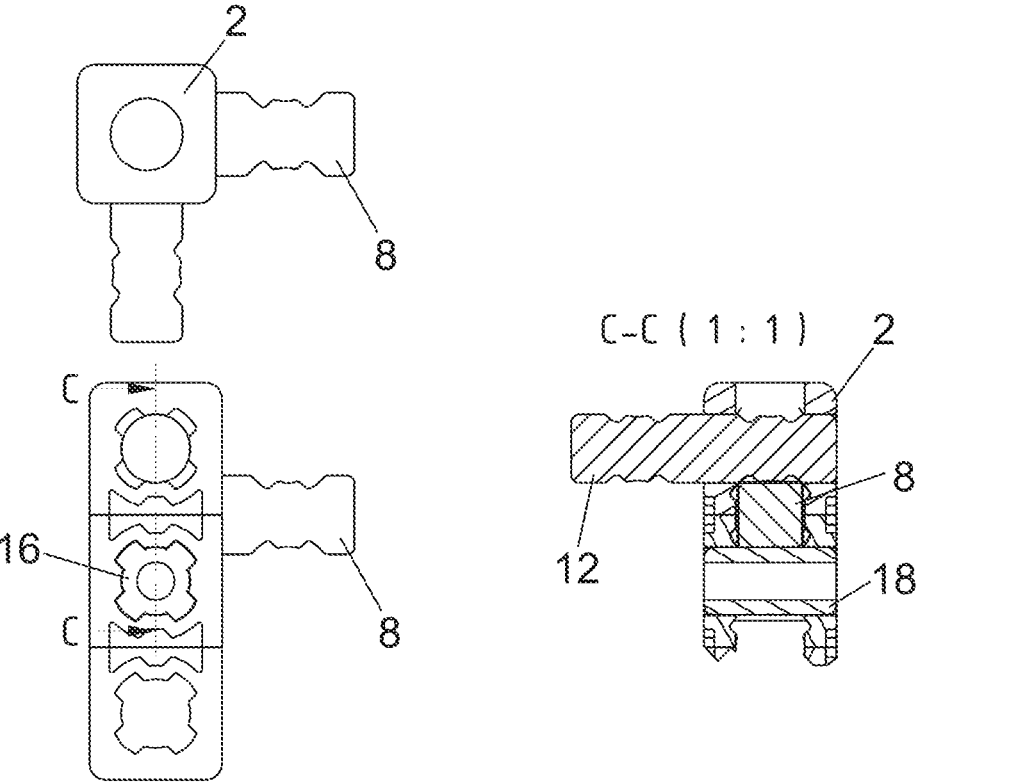
FIG. 10: schematic views from three sides with a sectional representation; wherein a blocking function of a connecting system according to the invention is illustrated using a securing blocking element.

FIG. 10 shows schematic views from three sides with a sectional representation, wherein a blocking function of a connecting system 1 according to the invention is illustrated using a cruciform connection element 8. The function for preventing the round connection element 12 from being pulled out, but maintaining its rotatability, corresponds to the function explained in FIG. 9 in principle.

Figure 11:
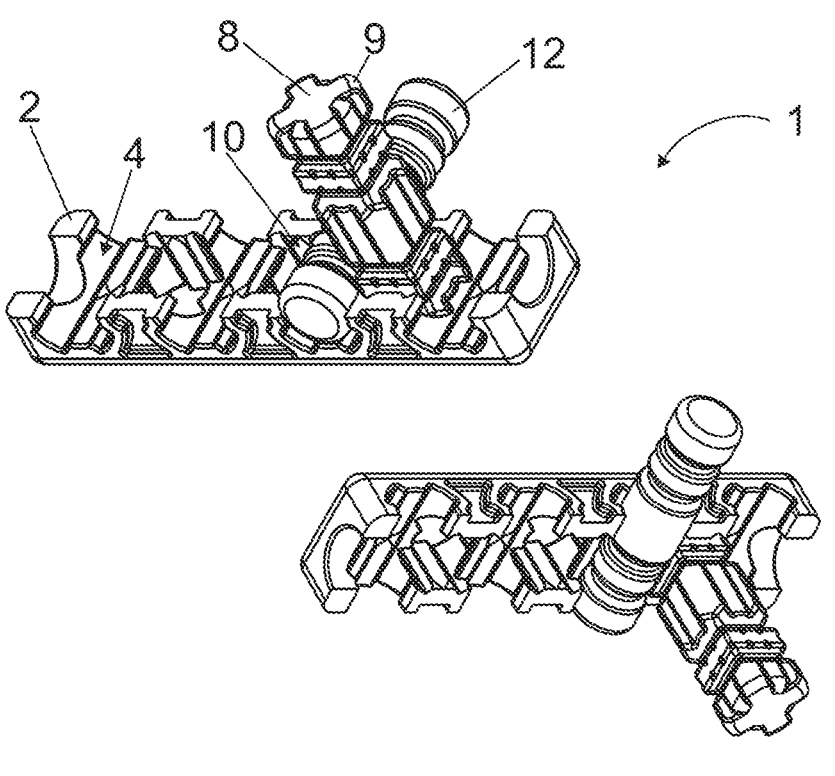
FIG. 11: schematic views from three sides and in two perspectives of an embodiment of a connecting system according to the invention with a cruciform connection element and a round connection element.
Figure 11:
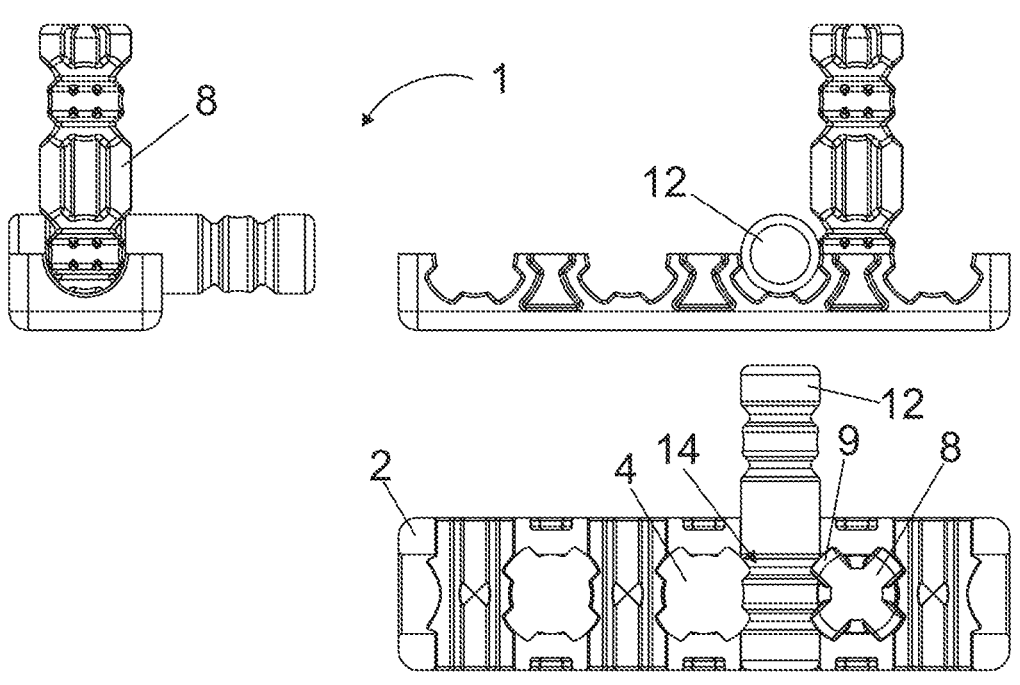

FIG. 11 shows schematic views from three sides and in two perspectives of an embodiment of a connecting system 1 according to the invention with a cruciform connection element 8 and a round connection element 12 arranged adjacent to one another in the hole carrier 2. The cruciform connection elements 8 are illustrated in a sectionally depicted hole carrier 2. It is shown that the parts fit together with almost no play. At the same time, this arrangement effectuates a block against pull-out of the cruciform connection element 8 first inserted, the blocking being accomplished by the cruciform connection element 8 inserted last. Thus, the sequence of assembly is important to the manner of blocking of the connection elements.

Figure 12:
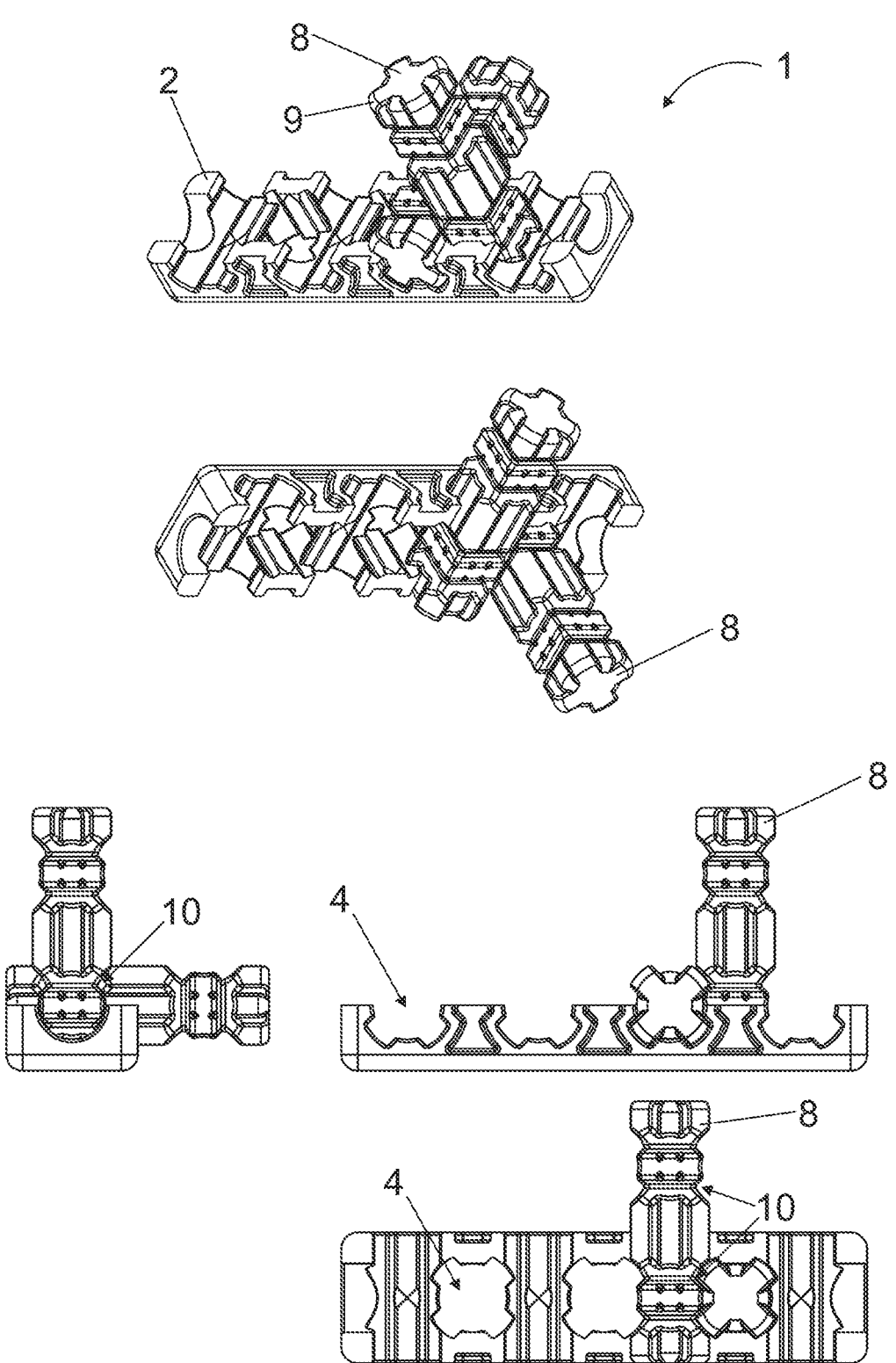
FIG. 12: schematic views from three sides and in two perspectives of an embodiment of a connecting system according to the invention with two cruciform connection elements.

FIG. 12 shows schematic views from three sides, and in two perspectives, of an embodiment of a connecting system 1 according to the invention with two cruciform connection elements 8 depicting an adjacent connection element, which is a cruciform connection element 8, being illustrated in a sectionally depicted hole carrier 2. It is shown that the parts fit together with almost no play. At the same time, this arrangement effectuates a blocking against pull-out of the connection element 8 first inserted, the blocking being accomplished by the cruciform connection element 8 last inserted. Thus, the sequence of assembly is important to the manner of blocking of the components.

Figure 13:
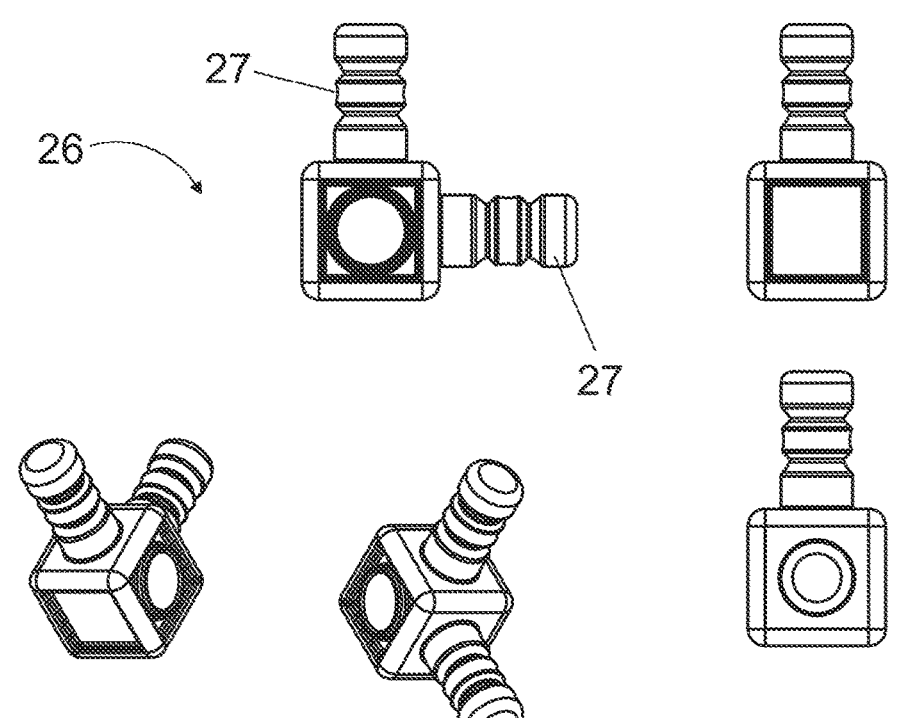
FIG. 13: schematic views from three sides and in two perspectives of an embodiment of a round connector angle piece according to the invention.

FIG. 13 shows schematic views of three sides, and in two perspectives, of an embodiment of a round connector angle piece 26 according to the invention, an angle piece with two round pins 27 for connection in the end openings 6 or the side openings 4. The round pins 27 positioned at the round connector angle piece 26 resemble the round connection elements 12 (see FIG. 4) described above and adapt the dual annular groove 14 explained there for securing purposes.

These round pins 27 are not drilled, and have no holes, and therefore have no pin receptacle 24 (see FIG. 6) and are also not secured by a pull-out preventer 22 (see FIG. 7) against being pulled out. A connection can be made in the side openings 4 of the hole carriers 2. The component-specific angular position of the round pins 27 relative to one another can be established in steps or continuously from 90° (as shown in the example) to −90°, thus generating a range of 180° of freely selectable connection directions.

Figure 14:
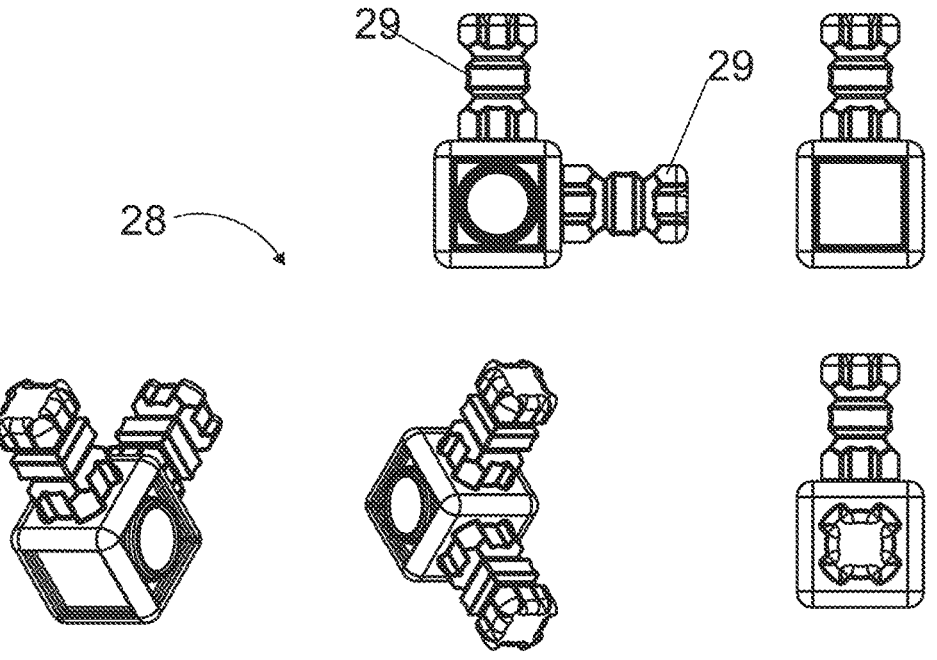
FIG. 14: schematic views from three sides and in two perspectives of an embodiment of a cruciform connector angle piece according to the invention.

FIG. 14 shows schematic views of three sides, and in two perspectives, of an embodiment of a cruciform connector angle piece 28 as a supplement to the connecting system 1 according to the invention, an angle piece with positioned cruciform pins 29 for rotationally fixed connecting of a plurality of hole carriers 2 in freely selectable angular positions from 90° to −90° at the side openings 4, the positions being securable using a blocking element 16 or a securing blocking element 18 (see FIGS. 5 and 6). The cruciform pins 29 positioned at the cruciform connector angle piece 28 resemble the cruciform connection elements 8 (see FIG. 3) described above. These pins are notched peripherally by the dual groove 10 typical for the cruciform connection elements 8 so as to achieve the securing and rotational fixing mentioned. The component-specific angular position of the cruciform pins 29 relative to one another can be established in steps or continuously from 90° to −90°, thus generating a range of 180° of freely selectable connection directions.

Figure 15:
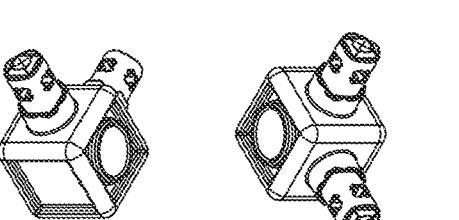
FIG. 15: schematic views from three sides and in two perspectives of a securing connector angle piece according to the invention.

FIG. 15 shows schematic views from three sides, and in two perspectives, of an embodiment of a securing connector angle piece 30 according to the invention, an angle piece with a securing pin 31 for a pull-out secured and rotationally fixed end connection (only achievable in combination with the securing blocking element 18 according to FIG. 6 and a pull-out preventer 22 according to FIG. 7) of multiple hole carriers 2 at fixed angular positions of 0/360°, 90°, 180°, and 270° at the end openings 6. The design of the securing pin 31 is based on the round connection element 12, but whose cylindrical shape is held at the base of the securing pin 31 where the pin is connected to the securing connector angle piece 30. The securing pin 31 further narrows to a diameter which allows for a clearance fit in the pin receptacle of the securing blocking element. The securing pin 31 has a securing receptacle 20 in its narrowed region, the receptacle running transverse to the pin axis. This structure facilitates installation of the securing pin 31 into the end opening 6 and the securing of the pin by way of a securing blocking element 18 inserted in an adjacent side opening 4 in combination with a pull-out preventer 22. The assembled state is shown in the following FIG. 16.

The securing connector angle piece 30 can be secured against pull-out in its final position by introducing the pull-out preventer 22, which is a securing pin, into the drilled securing blocking element 18 with the pin receptacle 24. This makes stable end-to-end connections of hole carriers 2 possible in a multitude of angular positions.

The variety of application, for example the round connector angle piece 26 (FIG. 13) and cruciform connector angle piece 28 (FIG. 14), in general increases the modularity of the overall connection and kit system according to the invention. Individual elements, such as angled hole carriers 2, can be completely eliminated from the connecting system 1. This reduces expenses for development and tools.

As a combination of round pin 27, cruciform pin 29 and securing pin 31 with an angle piece, designed as a round connector angle piece 26, cruciform connector angle piece 28 or securing connector angle piece 30, in various structures with a single or with different kinds of pins, the resulting capability being connection in end openings 6 and side openings 4 and combinations thereof. All possible variants of the angle piece 26, 28, 30 are combined to achieve this. For example, on one side of the angle piece 26, 28, 30 there is a round pin 27, and on the other side there is the cruciform pin 29 or the securing pin 31. In each case the appropriate securing elements must be used. This expands the combination options many times over. Thus, a variety of fixed or moving connections can be established by selecting the angle of the angle pieces 26, 28 and 30 in which pins 27, 29 and 31 lie relative to one another, and by selecting the connection technology, and this allows different relative positions of components, in particular of hole carriers 2, to be realized.

Through skilled selection of materials, the angle pieces 26, 28, and 30 can be designed to be optionally stiff or flexible. Thus, their advantages can be expanded, for example by virtue of targeted damping characteristics, spring characteristics or dedicated assembly stiffness.

All special components and associated angled tools can be eliminated from the connecting system by using angle piece 26, 28 and 30. Thus, it is possible to create the angular positions using very few intermediate pieces. Three preferred variations are provided at 45°, 60°, 75° and 90°, each of these variations using the same working principles equally and for all other angular positions. FIGS. 13 to 15 represent the 90° variations, respectively. The degree indicated refers to the relative position of round pin 27, cruciform pin 29 and securing pin 31 relative to one another, i.e. different angular positions can be depicted independent of the geometry or function selected.

Figure 16:
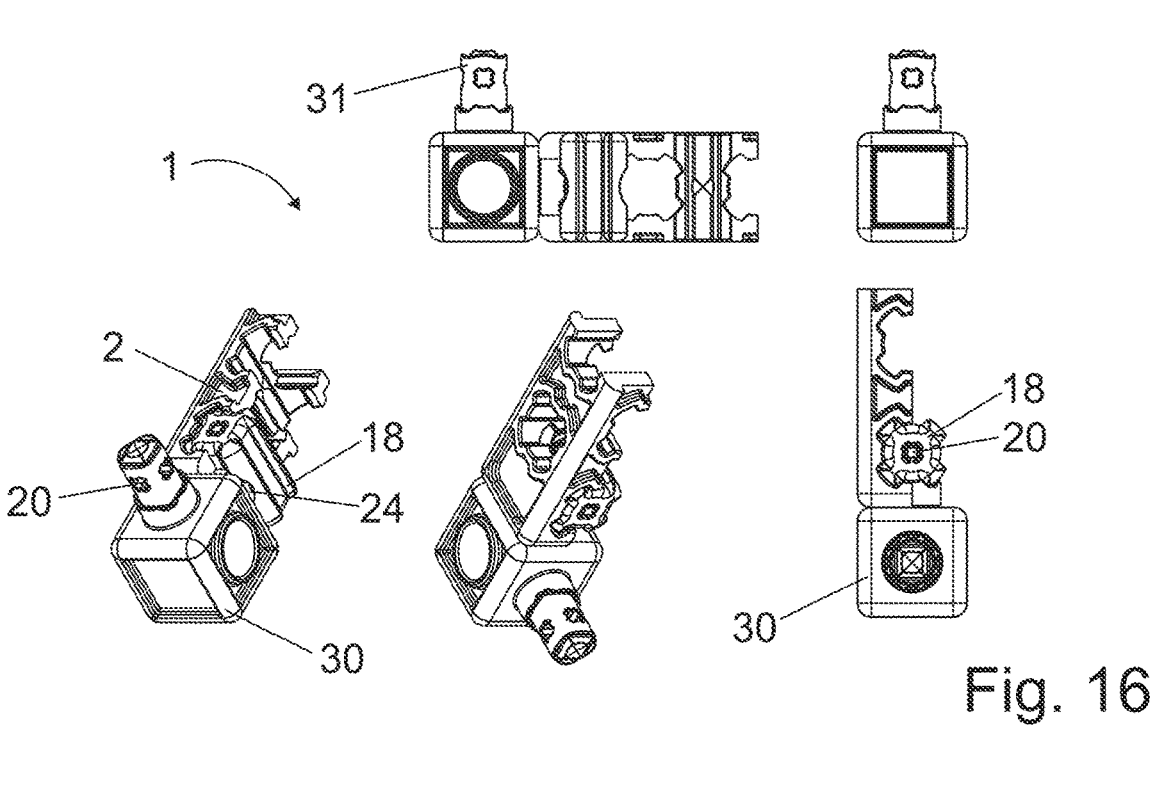
FIG. 16: schematic views from three sides and in two perspectives of an embodiment of a connecting system according to the invention with a securing connector angle piece and a securing blocking axis.

FIG. 16 shows schematic views from three sides, and in two perspectives, of an embodiment of a connecting system 1 according to the invention with a securing connector angle piece 30 and a securing blocking axis 18. This additionally illustrates the options of corner connection and end connection with the aid of the appropriate securing elements. A combination of securing connector angle piece 30, securing blocking axis 18 and an exemplary hole carrier 2 is shown in order to illustrate that the principle of geometric penetration is used here as well to provide positional securing and pull-out prevention.

Figure 17:
FIG. 17: a schematic perspective view and from three sides of a securing connector 34 according to the invention.

FIG. 17 shows a schematic perspective of an embodiment of a securing connector 34 according to the invention. This connection element for end openings 6 has a securing pin 31 on both ends and is used to establish abutting end connections between hole connectors 2. The cylindrical shape is suitable for penetrating into the end openings 6. A central peripheral bead 36 prevents too deep of a penetration and represents a positional boundary. In its final position, the securing connector 34 can be secured against being pulled out by inserting a pull-out preventer 22 into a securing blocking element 18 with a pin receptacle 24, as was already described (see FIGS. 15 and 16). This makes stable end-to-end connections possible in an abutting position.

Figure 18:
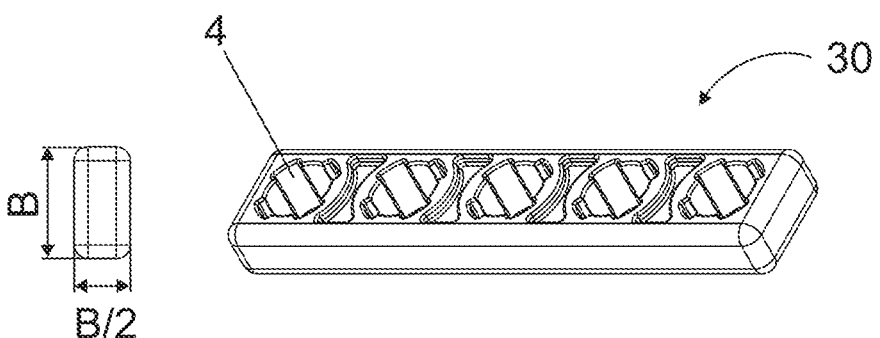
FIG. 18: a schematic perspective view of an embodiment of a spacing element 38 as a further component in the connecting system according to the invention.

FIG. 18 shows a schematic perspective view of an embodiment of a spacing element 38 as a further component in the connecting system 1 according to the invention, representing a supplement to the other functional parts. The spacing element 38 can be installed in the same manner as the hole carrier 2 and parallel thereto since it has side openings 4 with the same contour as in the hole carrier 2. The spacing element 38 is always used where ergonomic questions are at issue, i.e. the active utility of the assemblies created from the connecting system according to the invention (set-up width of legs, reachable handles and handling units).

The spacing element 38 is also used as a reinforcing strut in trusses or for fastening and supplementation in spatial support structures (such as cranes, excavator arms), saving design space in the process. In an ergonomic sense, it is advantageous to use this part in pairs. The thickness of the spacing element 38 is 0.5 B, and therefore is equal to the overall thickness B when used in pairs, which is the base dimension of the connecting system according to the invention.

In general, all elements of the connecting system according to the invention can also be used as adapters when designed at half dimensions of B/2, as it were, or at dimension B in order to adapt special parts and special designs.

Figure 19:
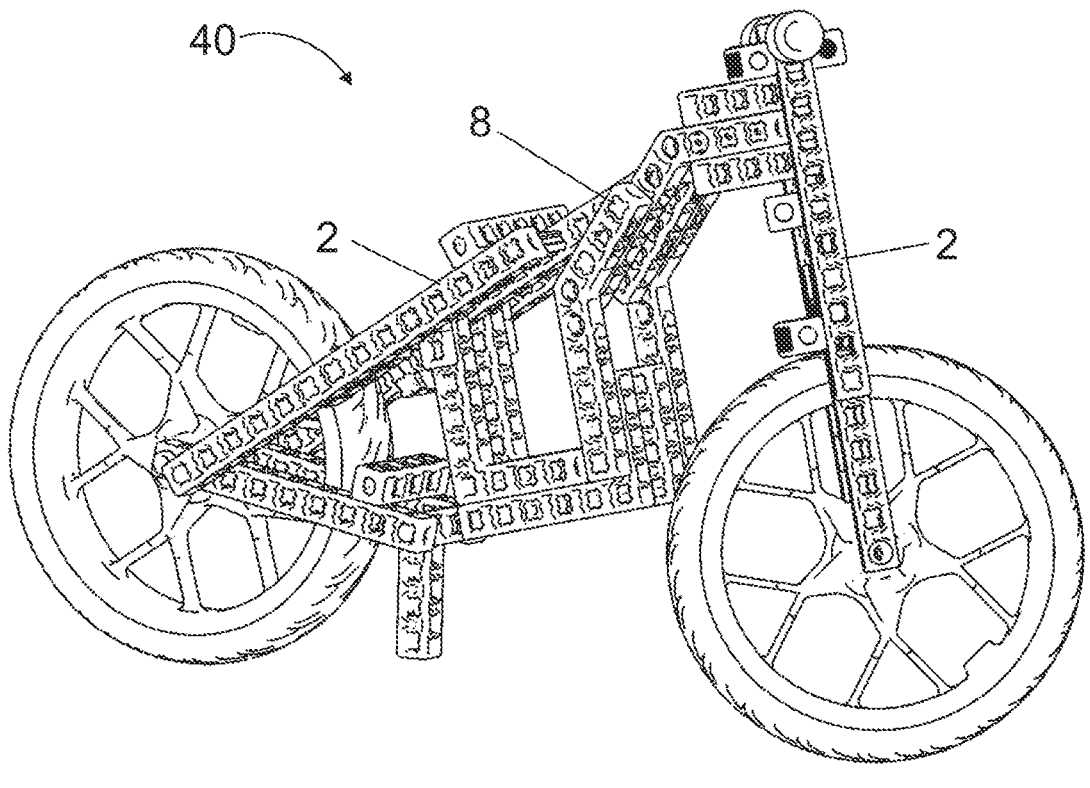
FIG. 19: a schematic perspective view of a motorcycle, assembled from the connecting system according to the invention.

FIG. 19 shows a schematic perspective view of a motorcycle 40, assembled from hole carriers 2, cruciform connection elements 8 and other design elements of the connecting system according to the invention, supplemented by individually required elements such as wheels and the steering wheel.

The motorcycle 40 shows the possibility of constructing practical and useful objects which satisfy high safety requirements. The safety is ensured by the functionality described above, which prevents unintended loosening of connections.

To prevent undesired disassembly by unauthorized parties, casing elements are provided as securing elements, which are not shown, the casing elements preventing access to the individual parts for the most part using a safety lock system. Intended removal can never be done without access using tools. For safety reasons, an increase in cognition and increased motor skills are required to perform removal. It is helpful to make use of securing elements at neuralgic points (such as axes, joints, steering head).

LIST OF REFERENCE NUMERALS

1 Connecting system
2 Hole carrier
4 Side opening
6 End opening
8 Cruciform connection element, connection element
9 Cross rib
10 Dual groove, groove
12 Round connection element, connection element
14 Dual annular groove, groove
16 Blocking element
17 Pull-out hole
18 Securing blocking element
20 Securing receptacle
22 Pull-out preventer
24 Pin receptacle
26 Round connector angle piece, angle piece
27 Round pin, pin
28 Cruciform connector angle piece, angle piece
29 Cruciform pin, pin
30 Securing connector angle piece, angle piece
31 Securing pin, pin
34 Securing connector
36 Bead
38 Spacing element
40 Motorcycle, assembly, toy
B Width

The invention claimed is:

1. A connecting system (1), comprising at least one hole carrier (2) with a row of a plurality of side openings (4) made therein in a longitudinal direction, the openings being aligned in a first orientation and in a second orientation orthogonal thereto and being made transverse to the longitudinal direction, wherein the side openings (4) of the first or the second orientation are shifted by one half a distance between center axes of two adjacent side openings (4), the connecting system (1) further comprising at least one round connection element (12) or at least one cruciform connection element (8), characterized in that a distance between two adjacent side openings (4) along the first orientation is less than a thru hole diameter created by a corresponding side opening (4) along the second orientation, a distance between two adjacent side openings along the second orientation is less than a thru hole diameter created by a corresponding side opening along the first orientation, and the thru holes of the first and the second orientation partially penetrate one another; and wherein the side openings (4) have a cross section in which a circular cross section is superimposed by a cruciform cross section in such a way that a contour of the circle is broken up at four places evenly distributed along a periphery.

2. The connecting system according to claim 1, wherein at least one end face at a first and/or a second end of the at least one hole carrier (2) has end openings (6) with a same cross section as the side openings (4) or circular cross section alone.

3. The connecting system according to claim 1, wherein the at least one hole carrier (2) has a square cross section with edge length B and rounded edges transverse to the longitudinal direction.

4. The connecting system according to claim 1, wherein the at least one cruciform connection element (8) has a cross section which corresponds to that of the side openings (4) and/or wherein the at least one round connection element (12) has a cross section that corresponds to a circular portion of the cross section of the side openings.

5. The connecting system according to claim 4, wherein the connection system comprises at least one cruciform connection element, the at least one cruciform connection element (8) has at least one dual groove (10) on at least one side surface which extends in a longitudinal direction, a longitudinal side, the at least one dual groove (10) running transverse relative to the longitudinal direction and a profile of the at least one dual groove (10) corresponding to an external contour of the longitudinal side of the at least one cruciform connection element (8), and the at least one dual groove (10) having a depth which corresponds to a penetration of the side openings (4) of the first and the second orientation.

6. The connecting system according to claim 5, wherein the at least one cruciform connection element (8) has two dual grooves (10) and the at least one round connection element (12) has two dual annular grooves (14) and a length which is equal to twice an edge length B, a contour of the dual grooves (10) and the dual annular grooves (14) corresponding to a surface contour of the cruciform connection element (8), and a distance between the two dual grooves (10) or the two dual annular grooves (14) being equal to the edge length B.

7. The connecting system according to claim 4, wherein the connection system comprises at least one round connection element (12), the at least one round connecting element (12) has at least one dual annular groove (14) which runs along an outside surface in a circular fashion, and a profile of which corresponds to an outer contour of a longitudinal side of the at least one cruciform connection element (8), the at least one dual annular groove (14) having a depth which corresponds to a penetration of the side openings (4) of the first and the second orientation.

8. The connecting system according to claim 1, wherein at least one securing connector (34) is provided which has a securing pin (31) at each of its two ends, at least one of which is designed as a round pin (27) or a cruciform pin (29), both provided for insertion into a side opening (4), or as a securing pin (31) for insertion into an end opening (6).

9. The connecting system according to claim 1, wherein the at least one hole carrier (2) has a square cross section with edge length B, and wherein a blocking element (16) and/or a securing blocking element (18) is included whose cross sectional shape corresponds to that of the side openings (4) and whose length is equal to the edge length B.

10. The connecting system according to claim 1, wherein a pull-out preventer (22) is included for the cruciform connection element (8) and/or for the round connection element (12), the cruciform connection element (8) and/or the round connection element (12) having a securing receptacle (20).

11. The connecting system according to claim 1, wherein an angle piece (26, 28, 30) is provided which has at least two pins (27, 29, 31) which are aligned perpendicular with respect to one another.

12. The connecting system according to claim 11, wherein the angle piece is designed as a round connector angle piece (26) and has at least one round pin (27) as a pin, or wherein the angle piece is designed as a cross connector angle piece (28) and at least one cruciform pin (29) as a pin, or wherein the angle piece is designed as a securing connector angle piece (30) and at least one securing pin (31) as a pin.

13. A method for building an assembly (40) from a connecting system (1) according to claim 1, characterized in that a rotationally fixed connection of at least two hole carriers (2) is accomplished using the cruciform connection element (8) which is inserted into one side opening (4) of each one of the at least two hole carriers (2), that a rotatable connection of the at least two hole carriers (2) is accomplished using the round connection element (12) which is inserted into one side opening (4) or one end opening (6) each of each one of the at least two hole carriers (2), wherein a securing against pull-out of the cruciform connection element (8) or of the round connection element (12) is accomplished using a cruciform connection element (8) or a blocking element (16) or a securing blocking element (18) which is perpendicular to the cruciform connection element (8) or the round connection element (12) in an adjacent side opening (4).

14. The method according to claim 13, wherein a corner connection is accomplished using an angle piece (26, 28, 30), the protruding pins (27, 29, 31) of which being inserted into the side opening (4) or the end opening (6) of the hole carrier (2), and wherein an end connection is accomplished using a securing connector (34) whose protruding securing pins (31) are inserted into the end openings (6) of the hole carriers (2) to be connected.

15. The method according to claim 13, wherein the blocking element is designed as a securing blocking element (18) and comprises a securing receptacle (20) into which a pull-out preventer (22) is inserted which prevents removal of the securing blocking element (18), the pull-out preventer only able to be removed using a tool.

16. A connecting system (1) according to claim 1 for use as a toy (40), furniture system, module system or construction kit system.

*    *    *    *    *